April 13, 1965    C. W. MOTT, JR    3,177,640
BLADE CONSTRUCTION FOR A MOWER
Filed Oct. 4, 1963
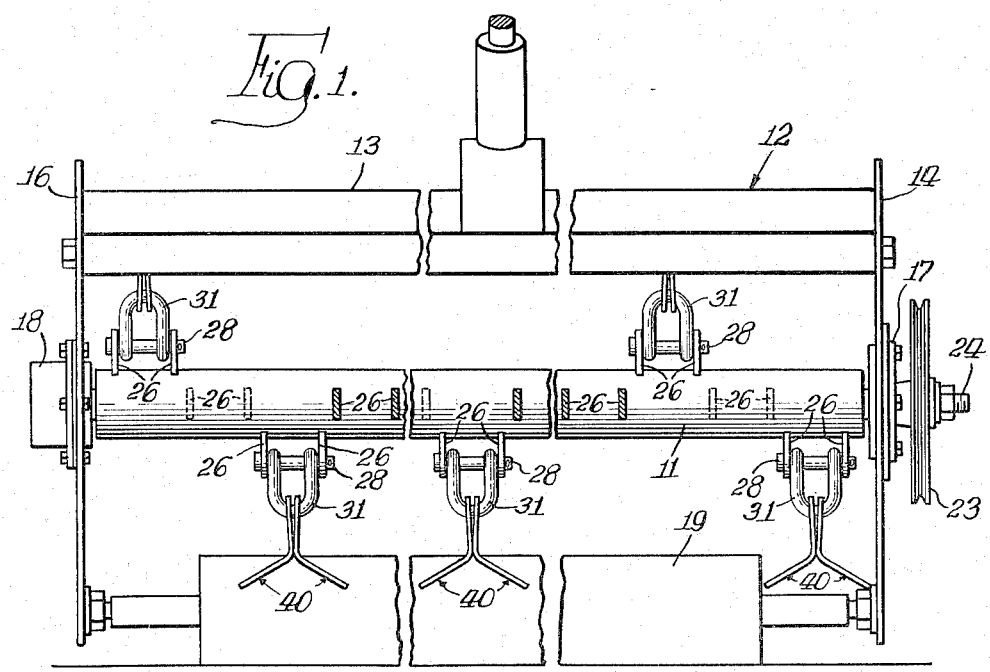
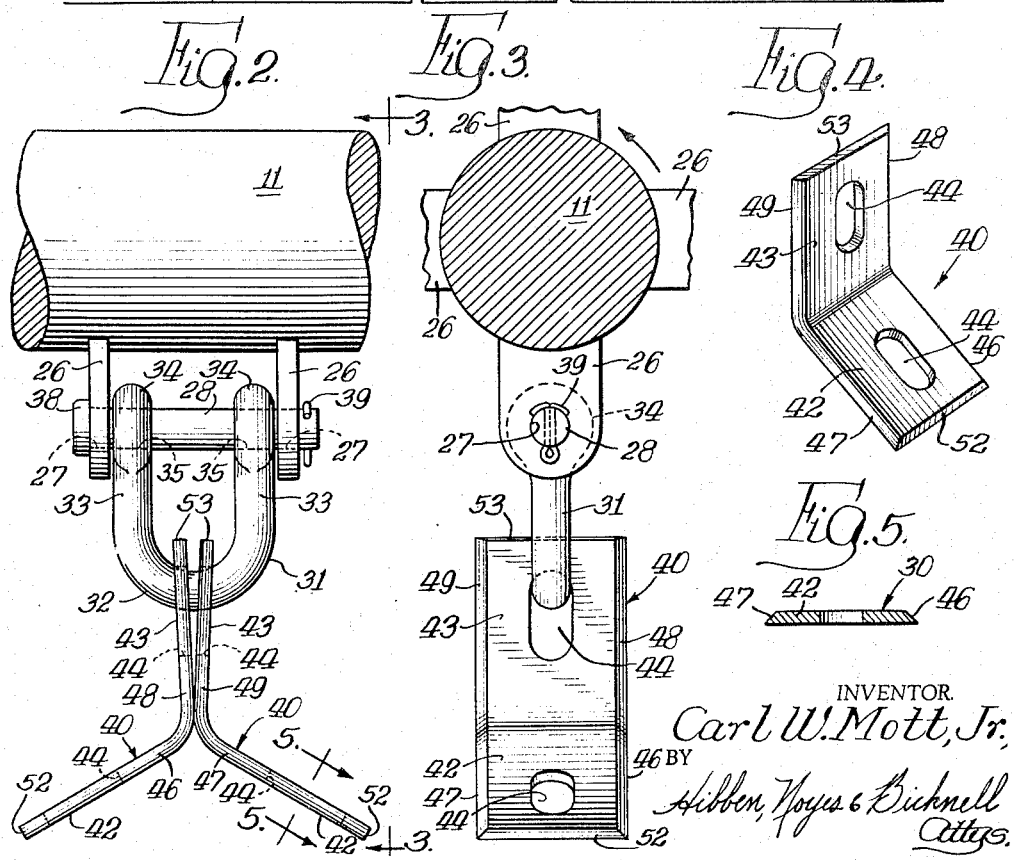
INVENTOR.
Carl W. Mott, Jr.
BY
Hibben, Noyes & Bicknell
Attys.

United States Patent Office 3,177,640
Patented Apr. 13, 1965

3,177,640
BLADE CONSTRUCTION FOR A MOWER
Carl W. Mott, Jr., Western Springs, Ill., assignor to Mott Corporation, La Grange, Ill., a corporation of Illinois
Filed Oct. 4, 1963, Ser. No. 313,841
6 Claims. (Cl. 56—294)

This invention relates to mowers, and more particularly to a novel blade construction and mounting means for a mower.

In the Carl W. Mott patent, No. 2,711,067, issued June 21, 1955, a mower structure is disclosed with which the present blade construction is adapted for use. Such a mower includes a horizontal rotatably driven shaft extending transversely of the direction of travel of the mower. The shaft is provided with blade connecting means comprising a plurality of axially and circumferentially spaced lugs which extend radially from the shaft, and pivotally mounted links are detachably secured to the lugs for loosely securing a plurality of blades or knives to the shaft. The blades are adapted to extend outwardly from the lugs by virtue of centrifugal force. The connecting means is adapted to prevent disconnection of the blades during operation even when the blades strike a hard object such as stones or the like.

Because the cutting edges of the blades in a mower such as is disclosed in the above mentioned patent may become dull or nicked after extended use, or after contacting hard objects, it is necesasry to either replace the blades or sharpen their cutting edges in order to restore cutting efficiency. To minimize replacement or sharpening of the blades, blades have been manufactured with a portion of each longitudinal side edge sharpened so that the blade may be reversed, after the cutting portion on one edge becomes dulled, to bring the cutting portion of the other edge into cutting position. However, after both cutting edges are dulled, the blade must either be replaced or the blade removed and the edges sharpened.

Accordingly, it is a general object of the present invention to rovide an improved mower blade construction having an extended useful life.

Another object is to provide an improved mower blade construction having four separate cutting edges, each of which may be selectively rendered operable upon side-for-side and/or end-for-end shifting of the blade with respect to its mounting.

A further object is to provide a blade construction of the foregoing character together with novel means for connecting the blade to the shaft.

Other objects and advantages of the invention will become apparent from the following description and accompanying drawing, in which:

FIG. 1 is a front elevational view of a mower having a rotatably driven horizontal shaft provided with a plurality of pairs of mower blades embodying the features of the present invention;

FIG. 2 is an enlarged front elevational view of one of the pairs of blades shown in FIG. 1;

FIG. 3 is a side elevational view taken substantially along the line 3—3 of FIG. 2;

FIG. 4 is a perspective view of a blade; and

FIG. 5 is a sectional view taken along the line 5—5 of FIG. 2.

In FIG. 1, a mower is illustrated such as is shown in the prior patent. Such a mower comprises a blade carrier in the form of an elongated horizontally disposed shaft 11 and an enclosing housing 12 which includes a generally cylindrical shroud portion 13 and a pair of end walls 14 and 16 carrying bearing structures 17 and 18 for supporting the respective ends of the shaft 11. A ground engaging roller 19 may be mounted between the end walls 14 and 16 for supporting the mower. A pulley 23 may be secured to a projecting end 24 of the shaft 11, outwardly of the end wall 14 for supplying power to rotate the shaft 11.

For detachably connecting a series of pairs of blades to the shaft 11, connecting means is provided. Such connecting means, in the present instance, comprises a plurality of axially and circumferentially spaced pairs of lugs 26 rigidly secured to the shaft 11, as by welding. An opening 27 (FIGS. 2 and 3) is provided in each lug 26, near the radial outer end thereof, for receiving pin means extending therethrough transversely of the lugs 26 which may be a single pin for each row of lugs but is herein shown as a separate pin 28 for each pair of blades.

A bifurcated link 31 preferably in the form of a U-shaped bail or shackle having a semi-circular bight portion 32 and parallel straight arm portions 33 is provided for connecting one or more blades, such as the blade 40, to a pair of the lugs 26. For this purpose, the ends, indicated at 34, of the arm portions 33 are provided with openings 35 to receive the pin 28. While the lugs 26 of each pair may be spaced axially only a sufficient distance apart to permit the ends 34 of the link 31 to be placed outside of the lugs, they are preferably spaced a sufficient distance to receive the ends 34 therebetween. The pin 28 is sufficiently long to permit its extension through the openings 35 in the ends 34 of a link 31 and the openings 27 in the ends of the lugs 26. One end 38 of the pin 28 may be enlarged to provide a head engageable with the outer side of one of the lugs 26 and the other end of the pin 28 may be provided with a hole for receiving a cotter pin 39.

As heretofore mentioned, each link 31 is adapted to receive and retain at least one and preferably a pair of cutter blades 40. Each blade 40, in the present instance, comprises a strip, preferably of metal, and bent on a line extending transversely of its length to provide two reversible cutting and mounting portions, indicated at 42 and 43, respectively. One of the portions is bent out of the plane of the other portion by an angle such that all different varieties of vegetation that might be cut, under varying moisture conditions, will be forced off the portion then serving as the cutting portion during operation of the mower. Such angle is preferably not substantially greater than about 66°. Preferably, the bend line passes through a point midway of the length of the blade so that the portions 42 and 43 are similar in size and shape.

Each blade portion 42, 43 is provided with a generally centrally disposed opening therethrough in the form of an elongated slot 44 extending longitudinally of the blade. The slots 44 are sufficiently large to permit free insertion of either end 34 of a link 31 through either of the reversible blade portions 42 and 43. When so engaged, the slots 44 permit radial inward shifting of the blades relative to the bight portion 32 of the link to minimize transmission of impact or shock load to the link, the pin, the lugs or the shaft, and prevent the blades from binding on the bight portion when a pair of the blades are thrown sideways from a back-to-back relation on the bight portion 32, such as when the cutting portions encounter an obstacle. As illustrated in FIGS. 2 and 3, the portion 43 of each blade 40 is engaged with the link 31 so as to function as a mounting portion and the portion 42 functions as a cutting portion. The blade may be reversed so that the portion 42 becomes the mounting portion and the portion 43 becomes the cutting portion.

In order to provide for effective cutting, the longitudinal side edges, indicated at 46 and 47, of the portion 42, and the longitudinal side edges, indicated at 48 and 49, of the portion 43 are sharpened as by beveling. In effect, the strip constituting the blade is sharpened throughout its length on both side edges.

Each pair of blades 40 is mounted on a link 31 in the manner illustrated in FIGS. 2 and 3 with the mounting portions, in this instance the portions 43, arranged back-to-back. When the shaft 11 is rotating, the link 31 and blades 40 will swing outwardly and radially of the shaft 11, due to centrifugal force, with the cutting portions, in this instance the portions 42, diverging from each other. Such force will also cause the mounting portions 43 to diverge somewhat, so that the blades of each pair will engage each other along a line adjacent their transverse bend lines. Because the blade connecting means 26, 28, 31 provides a universal connection between the blades 40 and shaft 11, the former are free to swing should they strike a solid object.

Assume that the various pairs of blades 40 are mounted on the shaft 11 in the manner illustrated in FIGS. 1 and 2 and that the edge 46 of the left blade and the edge 47 of the right blade are serving as cutting edges. After a certain period of operation these edges 46 and 47 may become dull or nicked. Consequently, to maintain effective cutting, other cutting edges must be substituted for the first mentioned edges 46 and 47. Because each link 31 normally carries a pair of the blades 40, new cutting edges on both blades may be brought into position at the same time merely by removing the pin 28 and reversing the blades and link 31, as a unit, with respect to the lugs 26 and then reconnecting the link to the lugs. Such reversal bring the cutting edge 47 of the former left blade (now right) and the cutting edge 46 of the former right blade (now left) into operable position. Alternatively, the pair of blades 40 could be removed from the link 31, and turned side-for-side, and then replaced on the link 31 and the link 31 then remounted in its former position with respect to lugs 26.

After the first reversal of one or both of the blades 40 of a pair to render the new cutting edges operable, these edges will in time become dull and become ineffective in cutting. Consequently, if each blade 40 only included the cutting edges 46 and 47, these edges would then have to be sharpened or the blade replaced. Either of these alternatives is unnecessary, however, because each blade 40 includes two additional and unused cutting adges, namely, the edges 48 and 49.

Thus, to provide a new pair of cutting edges, it is only necessary to reverse the blades end-for-end with respect to their supporting link 31. Such reversal, of course, necessitates disconnecting the link from the lugs and the blades from the link, then mounting the former cutting portions 42 of the blades on the link and reconnecting the link 31 to the lugs 26. When thus reversed, two new cutting edges, i.e. the cutting edge 49 of the now left blade and the cutting edge 48 of the now right blade, are rendered operable. When these edges become dulled or otherwise need to be restored, the blades 40 may again be reversed to render the remaining set of cutting edges operable. Thus, because each blade 40 is provided with four separate cutting edges, effective cutting by the blades may be readily maintained through a series of reversals of the position of the blades with respect to the mower shaft and the lugs.

I claim:

1. A blade construction for a mower having a rotatably driven horizontal shaft and connecting means for connecting the blade to the shaft, said blade comprising a strip bent along a line extending tranversely of its length to provide two portions inclined to each other, each of said portions having an opening therein adapted to selectively receive said connecting means, and the longitudinal side edges of said portions being sharpened to provide cutting edges, whereby a cutting edge of one of said portions is operable when the other of said portions is connected to said connecting means, said blade being reversible end-for-end with respect to said connecting means to permit a cutting edge of said other portion to become operable for cutting with said one portion adapted to be connected to said connecting means.

2. A mower blade construction according to claim 1, in which said transverse bend line is disposed substantially midway of the length of said blade.

3. A mower blade construction according to claim 1, in which one of said blade portions is bent out of the plane of the other of said portions by an angle not substantially greater than about 66°.

4. A mower blade construction according to claim 1, in which both longitudinal side edges of both of said portions are sharpened to provide four cutting edges, whereby said blade may be reversed side-for-side and end-for-end with respect to said connecting means to permit each of said four cutting edges to be rendered selectively operable.

5. In a mower having a rotatably driven horizontal shaft and blade connecting means carried by said shaft, blade means adapted to be connected to said connecting means comprising a pair of strip-like blades each bent along a line extending transversely of its length to define inclined cutting and mounting portions, each of said portions having an opening therein for receiving said connecting means, the longitudinal side edges of said portions being sharpened to provide four cutting edges, and the mounting portions of said blades being disposed substantialy back-to-back when said blades are connected to said connecting means and said mower shaft is rotating so that said cutting portions diverge from each other, said blade means being reversible side-for-side and end-for-end, with respect to said connecting means, to render the four cutting edges of each blade selectively operable.

6. In a mower having a rotatably driven horizontal shaft and lug means mounted on said shaft, at least one U-shaped link having a semi-circular bight portion and parallel straight arm portions, the ends of said arm portions having transversely aligned openings adapted to receive a pin for connecting said link to said lug means, and blade means carried by said link and comprising a pair of strip-like blades each bent along a line extending transversely of its length to define portions inclined to each other, each of said portions having an opening therein permitting engagement of said link therewith, and the longitudinal side edges of said portions of each blade being sharpened to provide cutting edges, whereby either portion may be a mounting portion or a cutting portion, the mounting portions of said blades being disposed substantially back-to-back when supported on said bight portion of said link and said shaft is rotating, said blades being reversible end-for-end with respect to said link to permit the cutting edges on the other portions of said blades to become operable.

References Cited by the Examiner

UNITED STATES PATENTS 2,941,347   6/60   Strom _____ 56—26
3,043,080   7/62   Mott _____ 56—294

T. GRAHAM CRAVER, *Primary Examiner.*

ANTONIO F. GUIDA, RUSSELL R. KINSEY,
*Examiners.*